H. W. TWADDLE.
GLUE POT.
APPLICATION FILED SEPT. 1, 1914.
1,161,551.
Patented Nov. 23, 1915.
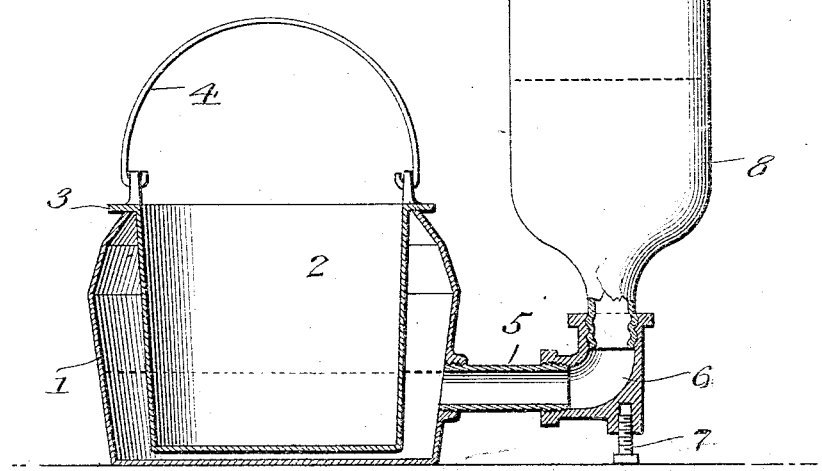
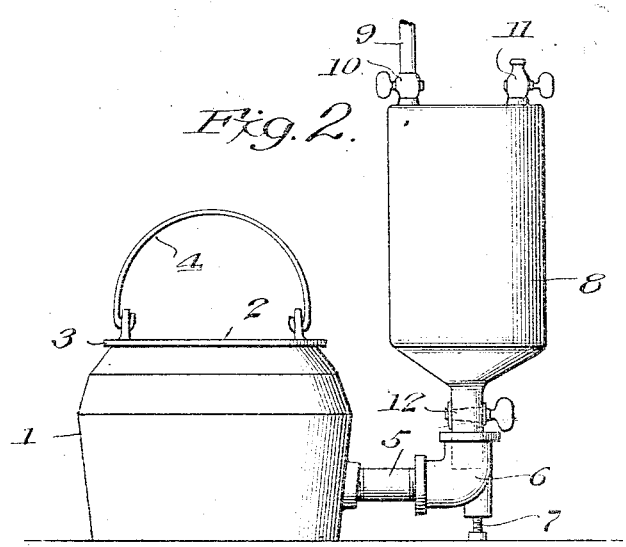
Witnesses
N. Peacock
H. E. Laughlin
Inventor
Hugh W. Twaddle
By Victor J. Evans
Attorney

UNITED STATES PATENT OFFICE.

HUGH W. TWADDLE, OF NEW ROCHELLE, NEW YORK.

GLUE-POT.

1,161,551.  Specification of Letters Patent.  Patented Nov. 23, 1915.

Application filed September 1, 1914. Serial No. 859,700.

*To all whom it may concern:*

Be it known that I, HUGH W. TWADDLE, a citizen of the United States, residing at New Rochelle, in the county of Westchester and State of New York, have invented new and useful Improvements in Glue-Pots; of which the following is a specification.

This invention relates to glue pots and it consists in the novel features hereinafter described and claimed.

An object of the invention is to provide a glue pot having means for maintaining the water in the pot at a uniform level when the pot is in use. With this object in view the pot is provided at its side and above its bottom with an outstanding nipple with which an L connection is connected. Means is provided for supporting the said L connection in an adjustable manner and a supply bottle or vessel is detachably connected with the said connection. This bottle may be of the usual form or type or it may be provided with means for connecting the same with a source of water supply if desired.

In the accompanying drawing:—Figure 1 is a side elevation of one form of the invention with parts in section. Fig. 2 is a side elevation of another form of the invention.

The pot 1 is of the usual configuration and is adapted to receive a bucket 2 in the usual manner the said bucket being adapted to contain the glue. The bucket 2 is provided at its upper edge with a flange 3 adapted to rest upon the upper edge of the pot whereby the bottom of the bucket is held in spaced relation from the bottom of the pot. The bucket 2 is further provided with a bail 4.

The pot 1 is provided at its side and at a point above its bottom with a nipple 5 and an L 6 is connected with the outer end of the said nipple. A screw 7 is adjustably mounted in the lower portion of the L 6 and is adapted to bear at its lower end against the support upon which the pot 1 rests and may be used for supporting the L 6 and the parts mounted thereon and may also be used for holding the pot 1 at a desired level or position upon the heater on which the said pot is mounted during the process of heating the glue.

A bottle 8 is detachably connected at its mouth with the upper end of the L 6 and is adapted to contain water. In the form of the invention as shown in Fig. 1 the bottle 8 is of usual configuration and when filled with water is connected with the upper end of the L 6 and the water flows down through the said L and the nipple 5 and into the pot 1 until the water assumes a level as indicated by dotted line in Fig. 1 which level is at the upper side of the nipple 5. The water then ceases to flow from the bottle 8, but as the water in the pot 1 evaporates and the level passes below the upper side of the nipple 5 the water will flow down from the bottle 8 and always maintain the water in the pot 1 at the level indicated by the dotted line in the said pot. Thus during the process of heating the glue the water is maintained at a constant or uniform level and therefore there is no danger of the glue boiling by reason of the fact that the water becomes exhausted in the pot. Inasmuch as the bottle 8 is transparent, or is fitted with transparent water column, the water therein may be readily observed and it may be seen at a glance when the water is getting low and consequently the bottle 8 may be removed at any time and replenished with water at any time after the water has been exhausted therefrom.

In the form as shown in Fig. 1 a pipe 9 is connected with the bottle 8 and the said pipe is provided with a valve 10. A pet cock 11 is mounted at the upper end of the bottle 8 and is valved as usual. A valve 12 is located at the neck of the bottle 8. In this form of the invention it is unnecessary to detach the bottle 8 from the L 6 when it is desired to replenish the said bottle with water. In the event that the water becomes exhausted from the bottle 8 the valve 12 is closed and the valve in the pet cock 11 is opened. The valve 10 is then opened and water is permitted to flow from the pipe 9 into the bottle 8 until the bottle 8 is filled. When this takes place the valve 10 is closed as is also the valve in the pet cock. The valve 12 is opened and the water is free to flow from the bottle 8 through the L 6 and nipple 5 into the pot 1. Therefore it will be seen a simple and durable means is provided for maintaining the water in a glue pot at a uniform level during the time that the pot is being used for heating glue.

Having described the invention what is claimed is:—

In combination with a glue pot, a nipple attached to the side thereof above the bottom thereof, an L connected with the nipple, a water receptacle detachably connected with the L, and means attached to the L for supporting the same and adjustable toward and away from the water receptacle to tilt the pot.

In testimony whereof I affix my signature in presence of two witnesses.

HUGH W. TWADDLE.

Witnesses:
  I. G. WILSON,
  H. R. DRAKE.